United States Patent [19]

Chupick

[11] Patent Number: 4,572,558
[45] Date of Patent: Feb. 25, 1986

[54] PLASTIC WHEEL OPENING MOLDING
[75] Inventor: Ronald Chupick, Warren, Mich.
[73] Assignee: General Motors Corporation, Detroit, Mich.
[21] Appl. No.: 584,008
[22] Filed: Feb. 27, 1984
[51] Int. Cl.$^4$ ............................................. B62D 25/16
[52] U.S. Cl. .................................. 293/128; 280/153 B
[58] Field of Search ................... 293/128, 1; 296/199; 280/153 R, 153 A, 154.5 R, 153 B

[56] References Cited
U.S. PATENT DOCUMENTS

| 1,893,975 | 1/1933 | Jackson | 280/154.5 R |
|---|---|---|---|
| 3,494,075 | 2/1970 | Kunevicius | 293/1 X |
| 3,634,991 | 1/1972 | Barton, Jr. et al. | 52/718 |
| 3,738,074 | 6/1973 | Tucker | 52/718 |
| 4,169,608 | 10/1979 | Logan | 280/153 R |

FOREIGN PATENT DOCUMENTS

| 1906874 | 9/1970 | Fed. Rep. of Germany | 280/153 B |
|---|---|---|---|
| 2523605 | 12/1976 | Fed. Rep. of Germany | 293/128 |
| 732759 | 6/1955 | United Kingdom | 280/153 B |

Primary Examiner—Robert B. Reeves
Assistant Examiner—Russell D. Stormer
Attorney, Agent, or Firm—William A. Schuetz

[57] ABSTRACT

A one-piece plastic wheel opening molding for a vehicle fender is disclosed. The molding is shaped complementary to the wheel opening and is L-shaped in cross section to define a first flange for abutting the fender on its exterior side and a second flange having a first portion which engages the rim of the fender along its underside and a second free end portion, the second flange having a circumferential groove to define a living hinge so that the free end portion of the second flange can be pulled to stretch the living hinge and then be folded over the rim along its top side to self-biasingly retain itself in place to securely attach the molding to the fender.

2 Claims, 3 Drawing Figures

PLASTIC WHEEL OPENING MOLDING

The present invention relates to a molding and more particularly, to a one-piece plastic selfretaining wheel opening molding for a fender of an automotive vehicle.

Heretofore, one-piece plastic wheel opening moldings have been provided which were attachable to the rim of a fender via fasteners. U.S. Pat. No. 4,169,608 shows such a molding. It is also known to attach reveal moldings to vehicles using hidden plastic members carried by the reveal molding. These plastic members have an integral over center hinge which snaps over center to biasingly hold the reveal molding in place. Examples of such moldings are shown in U.S. Pat. Nos. 3,634,991 and 3,738,074, assigned to the same assignee as the present invention.

An object of the present invention is to provide a new and improved one-piece plastic wheel opening molding for a fender of a vehicle and in which the molding can be readily attached to the fender and self-retain itself in place without the need for any fasteners, adhesives, etc.

Another object of the present invention is to provide a new and improved one-piece plastic wheel opening molding for a vehicle fender having a curved, inwardly extending rim and in which the molding is shaped complementary to the wheel opening and is L-shaped in cross section to define a first flange for abutting the fender on its exterior side and a second flange having a first portion which engages the rim along its underside and a second free end portion, and wherein the second flange has a groove intermediate its ends adjacent the inner end of the rim which extends throughout its arcuate length to define a living hinge, and wherein the free end portion of the second flange can be pulled to stretch the living hinge and then be folded over the rim along its top side and selfbiasingly retain itself in place to securely attach the molding to the fender.

The present invention further resides in various novel constructions and arrangement of parts, and further objects, novel characteristics and advantages of the present invention will be apparent to those skilled in the art to which it relates and from the following detailed description of the illustrated, preferred embodiment thereof made with references to the accompanying drawings forming a part of this specification and in which similar reference numerals are employed to designate corresponding parts throughout the several views, and in which.

Figure 1:
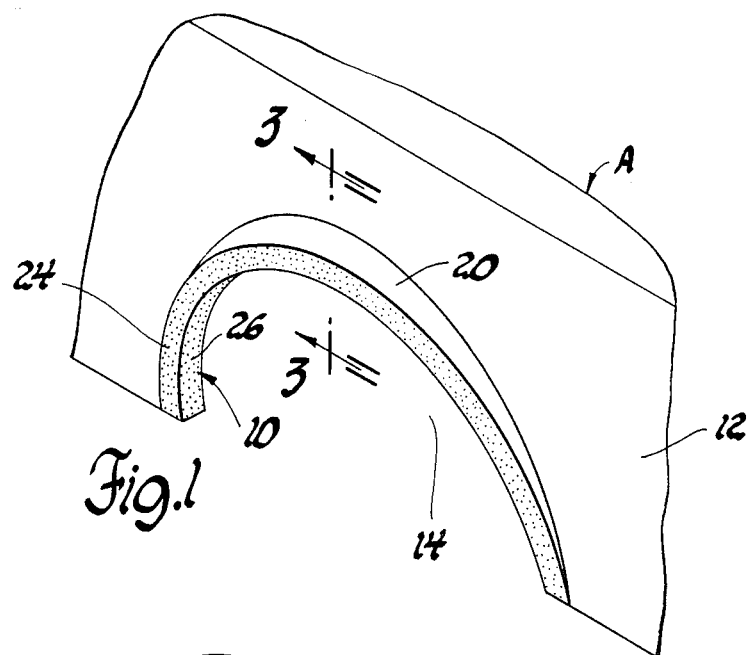
FIG. 1 is a fragmentary perspective view of a vehicle fender having the novel molding of the present invention attached thereto.
Figure 2:
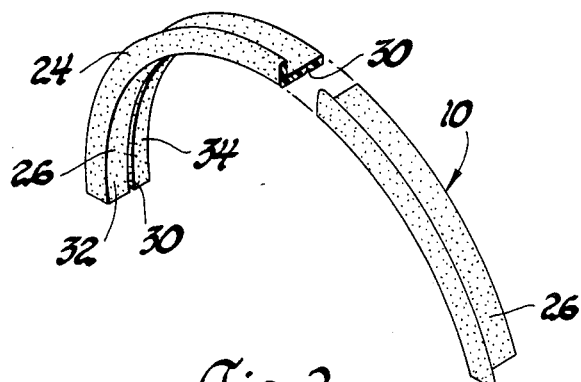
FIG. 2 is a perspective view of the novel molding of the present invention.

In accordance with the provisions of the present invention, a novel decorative window opening molding 10 is provided for attachment to a fender 12 of an automotive vehicle A. The fender 12 has an arcuate or curved wheel opening 14 which is defined by an arcuate or generally semicircular inwardly extending rim 16. The fender 12 also includes an exterior surface including, in the illustrated embodiment, an outer rim 18 of a constant width and which extends perpendicular to the inwardly extending rim 16. In addition the fender includes a flared portion 20 integral with the remainder of the exterior surface of the fender 12.

The novel wheel opening molding 10 is made from a suitable thermo-plastic material and in the as-molded condition is arcuate and shaped complementary to the rims 16 and 18 defining the wheel opening 14. The wheel opening molding 10, in the as-molded condition, is L-shaped, as viewed in cross section, to define a first flange 24 and a second flange 26 which extends perpendicular to the first flange 24. The molding 10 is also provided with a V-shaped groove or notch 30 in the second flange 26 along its underside and which extends throughout the arcuate extent of the second flange 26. The groove 30 divides the second flange 26 into an aligned first flange portion 32 and a second flange portion 34 and defines a living hinge 36 intermediate the ends of the second flange 26.

Figure 3:
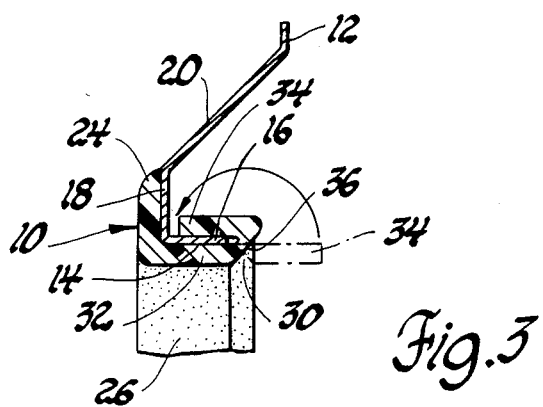
FIG. 3 is a fragmentary sectional view taken along the lines 3—3 of FIG. 1.

The molding 10 is attachable to the vehicle fender 12 by inserting the second flange 26 within the wheel opening 14 until the first flange 24 abuts the outer rim 18 of the fender, as shown in FIG. 3. When in this position the first flange portion 32 of the second flange 26 will be in engagement with the rim 16 along its underside and the living hinge 36 will be located adjacent the inner end of the rim 16.

The molding 10 is secured to the rim 16 of the fender 12 by pulling on the second flange 34 to stretch the living hinge 36 and then folding the second or free flange portion 34 upwardly and over the rim 16 so that it engages the rim 16 along its top side. Since the second flange 34 is arcuate, it will seek to assume an arcuate position like it had in the as-molded condition and therefore be self-biased into engagement with the top of the rim 16 to securely retain the molding 10 in place.

From the foregoing, it should be apparent that a new and improved, one-piece plastic wheel opening molding for a fender of a vehicle has been provided and in which the molding can be readily attached to the fender and self-retains itself in place without the need for any fasteners, adhesives, etc.

Although the illustrated embodiment thereof has been described in great detail, it should be apparent that certain modifications, changes and adaptations may be made in the illustrated embodiment, and that it is intended to cover all such modifications, changes and adaptations which come within the spirit of the present invention.

The embodiments of the invention in which an exclusive property or privilege is claimed are defined as follows:

1. A one-piece plastic wheel opening molding for attachment to an automotive fender having an exterior surface and a laterally inwardly and arcuately extending fender rim, said fender rim having an arcuately extending upper side and an arcuately extending underside defining the wheel opening, said molding being shaped complementary with said wheel opening and having a cross section which is L-shaped to define first and second flanges in the as-molded condition, said first flange being engageable with said fender along said exterior surface thereof adjacent said fender rim when said molding is being attached to said fender, said second flange having a notch between its ends which extends throughout its arcuate extent to define a living hinge, said hinge separating first and second aligned flange portions of said second flange, said first flange portion engaging said underside of said fender rim when being attached to said fender, said second flange portion, after stretching said living hinge, being foldable over against said upper side of said fender rim, said second flange portion upon being folded over said upper side of said fender rim self-biasingly retaining itself in place to securely retain said molding in place on the fender.

2. A one-piece plastic wheel opening molding for attachment to an automotive fender having an exterior surface and a laterally inwardly and arcuately extending fender rim, said fender rim having an arcuately extending upper side and an arcuately extending underside defining the wheel opening, said molding being shaped complementary with said wheel opening and having a cross section which is L-shaped to define first and second flanges in the as-molded condition, said first flange being engageable with said exterior surface of said fender adjacent said fender rim when said molding is being attached to said fender, said second flange having a living hinge between its ends which extends throughout its arcuate extent, said hinge separating first and second aligned flange portions of said second flange, said first flange portion engaging said underside of said fender rim when being attached to said fender, said second flange portion, after stretching said living hinge, being foldable over against said upper side of said fender rim, said second flange portion upon being folded over said upper side of said fender rim self-biasingly retaining itself in place to securely retain said molding in place on the fender.

* * * * *